US006526834B1

(12) United States Patent
Kohler et al.

(10) Patent No.: US 6,526,834 B1
(45) Date of Patent: Mar. 4, 2003

(54) PIEZOELECTRIC SENSOR

(75) Inventors: David Kohler, Bally, PA (US); Jeffrey D. Swan, Westchester, PA (US)

(73) Assignee: Measurement Specialties, Incorporated, Norristown, PA (US)

( * ) Notice: Subject to any disclaimer, the term of this patent is extended or adjusted under 35 U.S.C. 154(b) by 0 days.

(21) Appl. No.: 09/645,007

(22) Filed: Aug. 23, 2000

(51) Int. Cl.$^7$ ............................................. G01B 7/16
(52) U.S. Cl. ........................................................ 73/777
(58) Field of Search .......................... 73/774, 775, 776, 73/777, 796, 862.68

(56) References Cited

U.S. PATENT DOCUMENTS

| | | |
|---|---|---|
| 3,690,145 A | 9/1972 | Brisard |
| 3,750,127 A | 7/1973 | Ayers et al. |
| 4,383,239 A | 5/1983 | Robert |
| 4,712,423 A | 12/1987 | Siffert et al. |
| 4,741,231 A | 5/1988 | Patterson et al. |
| 5,008,666 A | 4/1991 | Gebert et al. |
| 5,127,637 A | 7/1992 | Castel |
| 5,142,914 A | 9/1992 | Kusakabe et al. |
| 5,206,642 A | 4/1993 | Gregoire et al. |
| 5,214,967 A | 6/1993 | Grogan |
| 5,265,481 A | 11/1993 | Sonderegger et al. |
| 5,451,373 A * | 9/1995 | Lewis et al. ............ 422/82.13 |
| 5,488,872 A | 2/1996 | McCormick |
| 5,501,111 A | 3/1996 | Sonderegger et al. |
| 5,522,468 A | 6/1996 | Dohrmann et al. |
| 5,742,562 A * | 4/1998 | Marschall et al. .......... 367/188 |
| 6,041,783 A * | 3/2000 | Gruenke .................... 128/782 |

FOREIGN PATENT DOCUMENTS

| | | |
|---|---|---|
| DE | 2 330 162 | 12/1974 |
| DE | 2 706 211 | 6/1978 |
| DE | 3 413 830 A1 | 10/1984 |
| EP | 0 287 250 | 10/1988 |
| EP | 0 231 669 | 10/1989 |
| EP | 0 491 655 B1 | 8/1995 |
| FR | 2 567 550 | 1/1986 |
| FR | 2 596 568 | 10/1987 |
| GB | 1544856 | 4/1979 |

OTHER PUBLICATIONS

Loop Sensors for Vehicle Classification, P. Davies, D. Salter and M. Bettison, University of Nottingham, Nottingham, England, undated.

Piezo–electric sensor VIBRACOAX, Thermocoax, SNC, Cambridge, England, undated.

Piezo–Electric Axel Load Sensors, R. C. Moore, M. Bettison, P. Davies, J. T. Stevenson and J. Fisher, International Conference on Road Traffic Data Collection, Dec. 1984.

Fundamental Properties of Piezo–Electric Axle Load Sensors, D. Salter, P. Davies, M. Bettison and F. Sommrville, University of Nottingham, Nottingham, England, Aug. 1984.

* cited by examiner

Primary Examiner—Max Noori
(74) Attorney, Agent, or Firm—Brinks Hofer Gilson & Lione

(57) ABSTRACT

A sensor having an inner conductor, a piezoelectric layer, and an outer conductor. The piezoelectric layer formed from a piezoelectric strip wrapped around the inner conductor and having adjacent turns wherein substantially each turn overlaps substantially fifty percent of an adjacent turn. The piezoelectric layer has a substantially uniform thickness. The outer conductor substantially surrounds the piezoelectric layer.

56 Claims, 3 Drawing Sheets

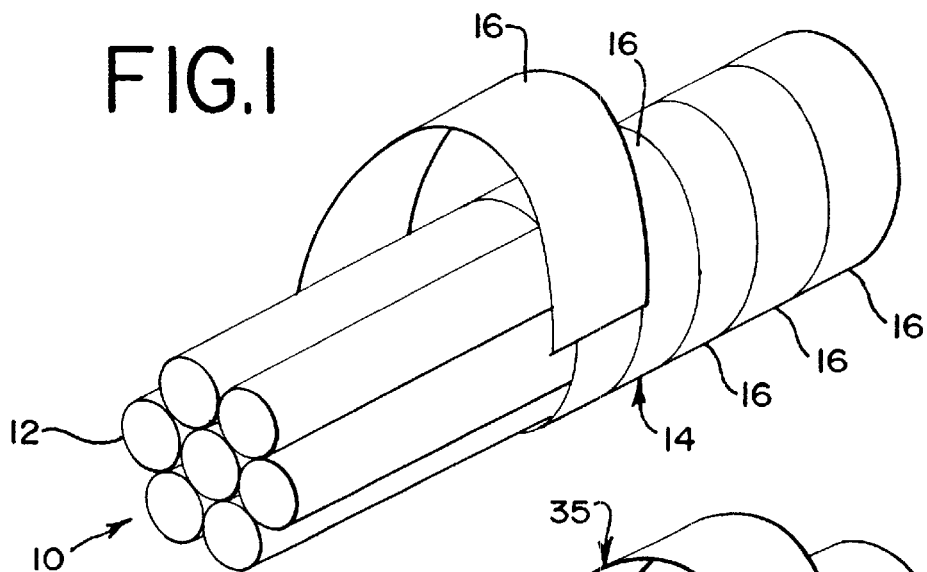
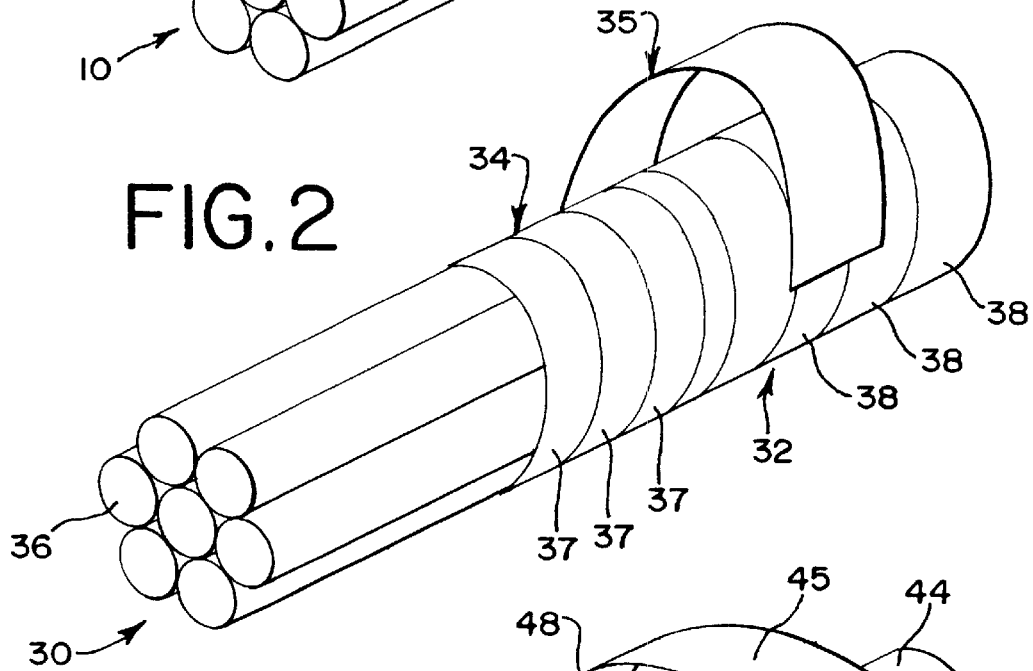
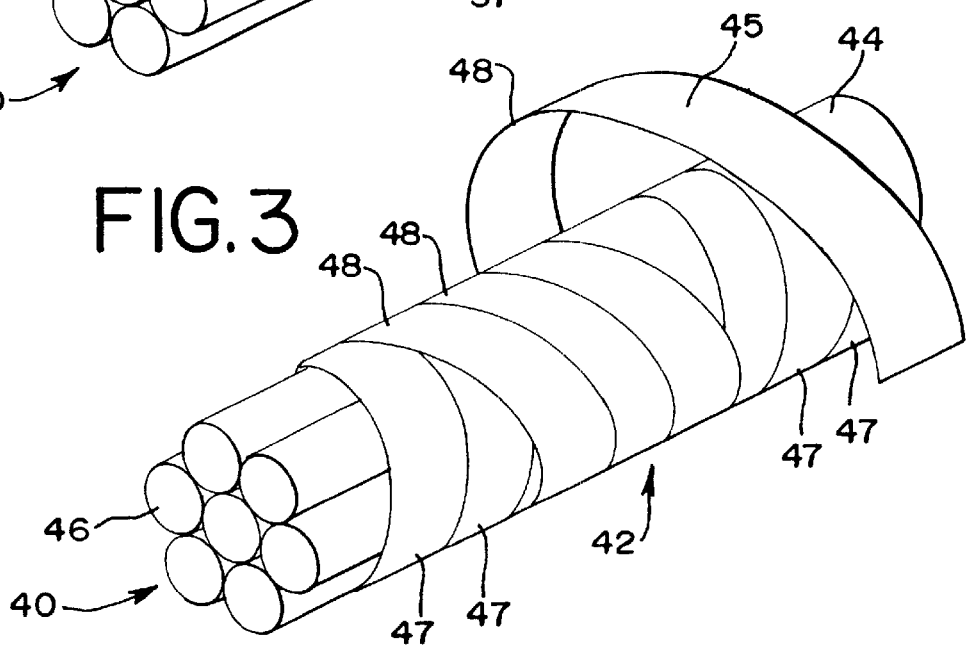

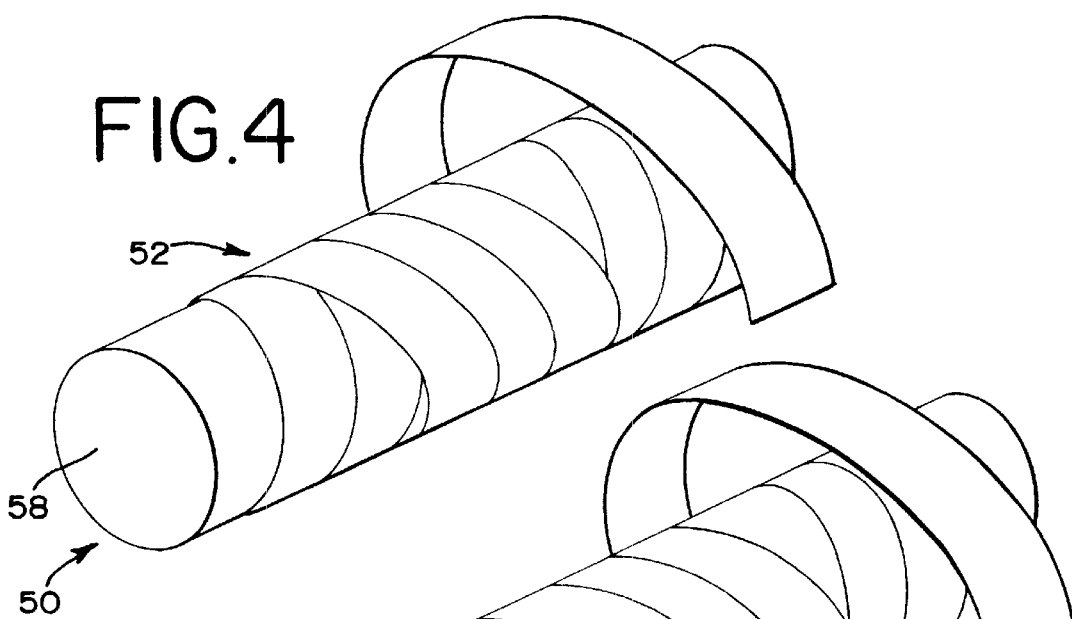
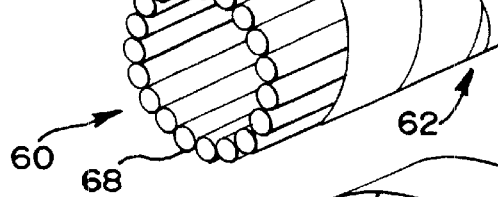
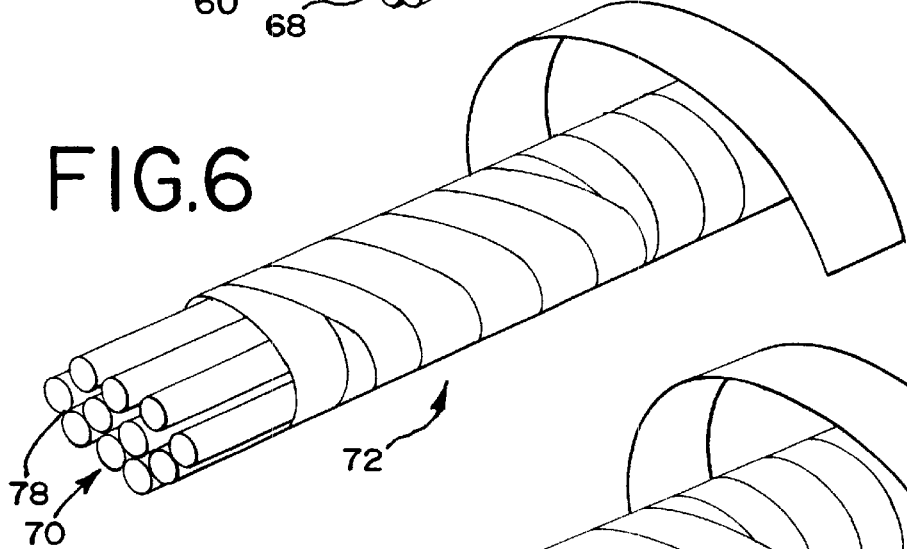

PIEZOELECTRIC SENSOR

FIELD OF THE INVENTION

The present invention relates generally to the field of piezoelectric sensors. In particular, the present invention relates to an improved piezoelectric sensor that is useful to sense pressure variations such as those produced by passing vehicles, i.e., trucks or automobiles or as required by security systems.

BACKGROUND OF THE INVENTION

Piezoelectric sensors are useful to sense pressure variations. These sensors are useful in a wide variety of applications such as with traffic management features, i.e., the measurement of vehicle speeds, vehicle classification and counting as well as weight in motion. Piezoelectric sensors are used as transducers because a potential difference is generated when the sensor is subject to a pressure change. A detection system is electrically coupled to the piezoelectric sensor and senses, for example, that a vehicle has passed over the sensor.

One known configuration for a piezoelectric sensor includes an inner conductor, an intermediate insulating member formed from a piezoelectric material and an outer conductor surrounding the intermediate insulating member. Certain polymeric materials such as polyvinylidene fluoride (PVDF) have been previously used as a piezoelectric material. However, PVDF has been found to have a relatively low piezoelectric activity unless there is an orientation stage in the manufacturing process. In addition, the PVDF exhibits poor thermal stability. Copolymers of PVDF have been successfully used as a piezoelectric material, but they are substantially more expensive than PVDF. Also, the application of the copolymer can be problematic because the copolymer must be uniformly polarized as it is extruded over the inner conductor.

Therefore, there is a need for an improved piezoelectric sensor that is more reliable than previous constructions. There is also a need for a sensor that is formed from a more economical piezoelectric material.

SUMMARY OF THE INVENTION

The present invention is directed to a sensor having an inner conductor, a piezoelectric layer, and an outer conductor. The piezoelectric layer is formed from a piezoelectric strip wrapped around the inner conductor that has adjacent turns. Substantially each adjacent turn overlaps substantially fifty percent of an adjacent turn. The piezoelectric layer has a substantially uniform thickness. The outer conductor substantially surrounds the piezoelectric layer.

According to another aspect of the invention, a sensor is provided having an inner conductor, a piezoelectric layer comprising two piezoelectric strips and an outer conductor. The piezoelectric layer is formed from first and second overlapping portions. The first portion is wrapped around the inner conductor and the second portion is wrapped over the first portion. The piezoelectric layer has a substantially uniform thickness. The outer conductor substantially surrounds the piezoelectric layer.

According to a further aspect of the invention, a sensor is provided having an inner conductor, a piezoelectric layer and an outer conductor. The piezoelectric layer is formed from first and second overlapping portions. The first portion is formed from a first piezoelectric strip wrapped around the inner conductor and having adjacent turns. Substantially each turn of the first piezoelectric strip overlaps substantially fifty percent of an adjacent turn. The second portion is formed from a separate second piezoelectric strip wrapped over the first portion. The second portion of the piezoelectric strip has adjacent turns wherein substantially each turn overlaps substantially fifty percent of an adjacent turn. The piezoelectric layer has a substantially uniform thickness. The outer conductor substantially surrounds the piezoelectric layer.

As used herein, the terms "first portion" and "second portion" are generally intended to include a piezoelectric material formed from both a single strip of material or two or more strips of material except when the "first portion" and the "second portion" are stated to be formed from separate elements.

As also used herein, the term "substantially fifty percent" is intended to include an overlap between 40%–60%.

The present invention is directed to a sensor using a piezoelectric layer formed from an economical material that is easily implemented in the sensor. These and other advantages of the invention will be best understood in view of the attached drawings and the following detailed description.

BRIEF DESCRIPTION OF THE DRAWINGS

FIG. 1 is a perspective view of a piezoelectric sensor in accordance with a first embodiment of the present invention with a single spiral wrap of a piezoelectric strip on a stranded round inner conductor;

FIG. 2. is a perspective view of a piezoelectric sensor in accordance with a second embodiment of the present invention with a double spiral wrap in the same direction of a piezoelectric strip on a stranded round inner conductor;

FIG. 3 is a perspective view of a piezoelectric sensor in accordance with a third embodiment of the present invention with a double spiral wrap in opposite directions of a piezoelectric strip on a stranded round inner conductor;

FIG. 4 is a perspective view of a piezoelectric sensor in accordance with a fourth embodiment of the present invention with a double spiral wrap in opposite directions of a piezoelectric strip on a solid round inner conductor;

FIG. 5 is a perspective view of a piezoelectric sensor in accordance with a fifth embodiment of the present invention with a double spiral wrap in opposite directions of a piezoelectric strip on a tubular round stranded inner conductor;

FIG. 6 is a perspective view of a piezoelectric sensor in accordance with a sixth embodiment of the present invention with a double spiral wrap in opposite directions of a piezoelectric strip on a flat stranded inner conductor;

FIG. 7 is a perspective view of a piezoelectric sensor in accordance with a seventh embodiment of the present invention with a double spiral wrap in opposite directions of a piezoelectric strip on a solid flat inner conductor;

DETAILED DESCRIPTION OF THE PRESENTLY PREFERRED EMBODIMENTS

Figure 8:
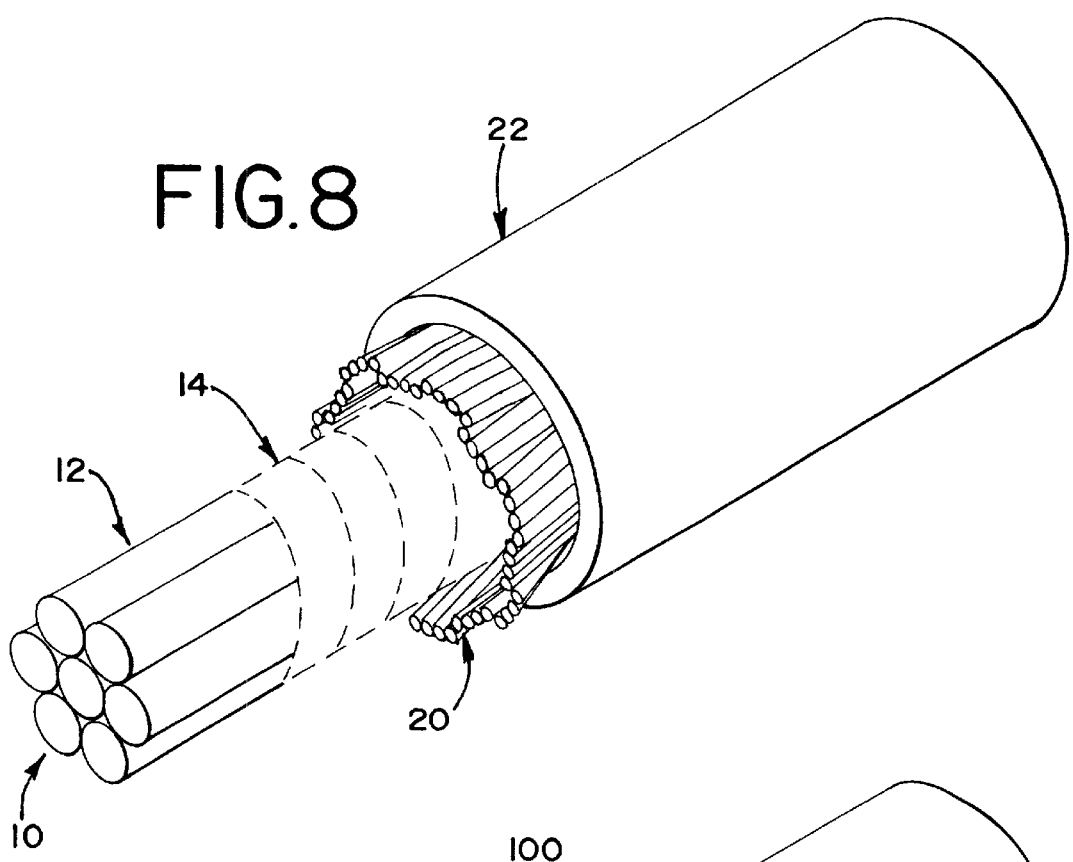
FIG. 8 is a perspective view of a piezoelectric sensor in accordance with the first embodiment of the present invention illustrating an outer conductive sheath and an outer jacket.

FIG. 1 illustrates a sensor 10 in accordance with a first embodiment of the present invention. A sensor in accordance with the present invention is useful in a variety of applications such as a security system or in traffic management. In a traffic management application, a sensor in accordance with the present invention can be used to detect the speed of a passing vehicle, to detect the passage of a vehicle into an intersection under a red light condition, or for vehicle counting and classification. A sensor in accordance with the present invention may also be used to measure the weight of a passing vehicle such as the measurement of a passing truck. Also, the present invention may be used in other applications such as security systems to detect passage of an unauthorized person into a secured area. As those of ordinary skill in the art will recognize, these applications can include the use of more than one sensor.

FIG. 1 illustrates a first embodiment of the sensor 10 having an inner conductor 12 and a piezoelectric layer formed from a single spiral wrapped piezoelectric strip 14. The inner conductor 12 is a stranded round inner conductor. The inner conductor 12 can include wire having a gauge between 10–28 with a preferred gauge between 16–20. The inner conductor 12 is also preferably made from copper. However, other conductive materials such as aluminum, lead, zinc or silver may also be implemented. A conductive plating such as silver or tin may also be applied to the inner conductor 12 to improve conductivity and reduce oxidation.

The piezoelectric strip 14 is preferably formed from polyvinylidene fluoride (PVDF) material such as that produced by Ato Fina under the name Kynar™ or Solef™ resin manufactured by Solvay of Belgium. However, other materials which can be synthesized into a piezoelectric material may also be used. To increase the piezoelectric activity of PVDF, it is stretched, annealed and polarized as recognized by those of ordinary skill in the art. A representative piezoelectric strip is available from Measurement Specialties, Inc. of Norristown, Pa., under Part No. 1-1002842-0. The PVDF is then cut into strips. PVDF is a relatively low cost material. The piezoelectric strip 14 is preferably formed from a uniaxially oriented material although a biaxially oriented material can also be used. The thickness of the piezoelectric strip 14 can vary depending on the desired capacitance, but relatively thin thicknesses within the range of 10–200 microns is generally preferred. The width of the piezoelectric strip may also vary depending on the application, e.g., the size of the inner conductor, but relatively thin widths within the range of 4–20 mm are generally preferred. Due to cost and the possibility of shorting, it is preferred that the piezoelectric strip 14 be formed from an unmetalized material, although one of the two opposite sides could be metalized to improve shielding characteristics.

FIG. 1 illustrates a single spiral wrapped piezoelectric strip 14. The strip 14 includes adjacent turns 16. Each turn 16 overlaps substantially fifty percent of an adjacent turn with the exception of the first and last turns. It is important that the piezoelectric strip 14 have a substantially uniform thickness along the inner conductor 12. This embodiment is particularly applicable for weigh-in-motion applications, which require a very uniform piezoelectric response along the length of the sensor. This embodiment is also useful in security systems.

Figure 9:
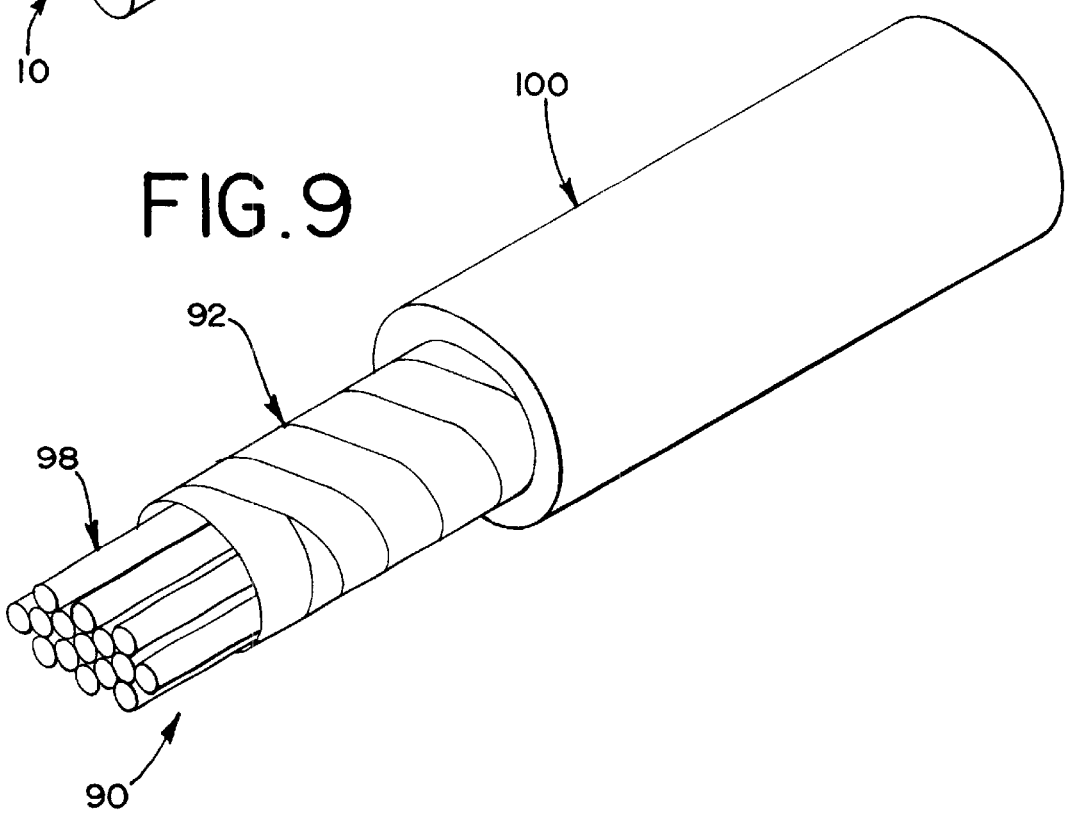
FIG. 9 is a perspective view of a piezoelectric sensor in accordance with an eighth embodiment of the present invention having particular application as a traffic sensor.

Referring to FIG. 8, an outer conductor 20 and protective jacket 22 are illustrated. The outer conductor 20 is formed from a stranded wire braid. However, a malleable tubular construction may also be used as shown in FIG. 9. The braid is overlapped to retain its structure. While brass or copper are the preferred materials because of their malleability, other materials such as aluminum or steel could also be implemented. Alternatively, a conductive polymer or a metal foil wrap could also be used. A protective jacket 22 encloses the assembly. The jacket 22 may be formed from polyethylene, polyvinyl chloride or polyurethane or other known materials. Medium density polyethylene is the preferred material because of its weatherability and flexibility.

When the sensor 10 is in use, the piezoelectric strip 14 will respond to incoming pressure waves or pulses (such as those created by a passing automobile) by polarizing its charge carrier and emitting an electrical signal proportional to the applied pressure. A detection system is connected to the sensor 10 in order to detect the electrical signal emitted by the piezoelectric strip.

FIG. 2. is a perspective view of a sensor 30 in accordance with a second embodiment of the present invention. The sensor 30 is constructed in essentially same manner as the sensor 10 shown in FIGS. 1 and 8 except that the piezoelectric layer is formed from a double spiral wrapped piezoelectric strip 32. The piezoelectric strip 32 includes a first portion 34 and a second portion 35. The first portion 34 and the second portion 35 are wrapped in the same direction. The first portion 34 is wrapped over the inner conductor 36 which is the same as described with respect to FIG. 1. The second portion 35 is wrapped in the same direction around the first portion 34. The first and second portions 34, 35 include turns 37, 38 that overlap substantially fifty percent of an adjacent turn.

FIG. 3 is a perspective view of a sensor 40 in accordance with a third embodiment of the present invention. The sensor 40 is constructed in essentially same manner as the sensor 30 shown in FIG. 2 except that the piezoelectric layer is formed from a piezoelectric strip 42 that is double spiral wrapped in opposite directions. The piezoelectric strip 42 includes a first portion 44 and a second portion 45. The first portion 44 and the second portion 45 are wrapped in the opposite directions. The first portion 44 is wrapped over the inner conductor 46 which is the same as described with respect to FIGS. 1 and 2. The second portion 45 is wrapped in the opposite direction of the first portion 44 and around the first portion 44. The first and second portions 44, 45 include turns 47, 48 that overlap substantially fifty percent of an adjacent turn.

FIG. 4 is a perspective view of a sensor 50 in accordance with a fourth embodiment of the present invention. The sensor 50 is constructed in essentially the same manner as the sensor 40 shown in FIG. 3 except that the piezoelectric strip 52 is wrapped around a solid round inner conductor 58. The solid round inner conductor 58 is useful because of its noncompliance and therefore, the enhancement of piezoelectric uniformity and sensitivity.

FIG. 5 is a perspective view of a sensor 60 in accordance with a fifth embodiment of the present invention that is particularly useful as a traffic sensor. The sensor 60 is constructed in essentially the same manner as the sensor 40 shown in FIG. 3 except that the piezoelectric strip 62 is wrapped around a tubular round stranded inner conductor 68. The tubular round stranded inner conductor 68 is useful because it can be conformed with a malleable tube to form the sensor 60.

FIG. 6 is a perspective view of a sensor 70 in accordance with a sixth embodiment of the present invention. The sensor 70 is constructed in essentially same manner as the sensor 40 shown in FIG. 3 except that the piezoelectric strip 72 is wrapped around a flat stranded inner conductor 78. The flat stranded inner conductor 78 is useful because it has a low profile and is suited for over-the-road applications and is more immune to bow waves in the road.

FIG. 7 is a perspective view of a sensor 80 in accordance with a seventh embodiment of the present invention. The sensor 80 is constructed in essentially the same manner as the sensor 40 shown in FIG. 3 except that the piezoelectric strip 82 is wrapped around a solid flat inner conductor 88. The solid flat inner conductor 88 is useful because it is more immune to bow waves and it is incompressible, thereby increasing sensitivity for in-the-road installations.

FIG. 9 is a perspective view of a sensor 90 in accordance with an eighth embodiment of the present invention. The sensor 90 is particularly suited for traffic management applications and includes a piezoelectric strip 92 and a stranded inner conductor 98. The sensor 90 is constructed and operates in essentially the same manner as the embodiment of FIG. 6 with the exception of the outer conductor 100 being formed from a malleable material such as brass or copper. The sensor 90 is illustrated after being crimped which provides better contact between the elements, improved noncompliance and a low profile particularly useful in traffic management. The sensor 90 is preferably crimped using nip rollers.

An alternate embodiment of the sensor is constructed in essentially the same manner as sensor 70 shown in FIG. 6 except that the piezoelectric strip is folded over substantially the entire length of the stranded inner conductor 118. This alternate embodiment includes two opposing end portions and two side portions with the side portions secured together along the length of the inner conductor.

Variations and modifications of the embodiments disclosed in this specification may be made without departing from the scope and spirit of the invention. For example, the present invention may be implemented with inner conductors of various shapes, sizes and materials. In addition, the present invention may be used with various applications such as numerous traffic applications or security applications. The aforementioned description is intended to be illustrative rather than limiting and it is understood that the scope of the invention is set forth by the following claims.

We claim:

1. A piezoelectric pressure/load sensor comprising:
    an inner conductor;
    a piezoelectric layer formed from a piezoelectric strip wrapped around the inner conductor having adjacent turns wherein substantially each turn overlaps substantially fifty percent of an adjacent turn and wherein the piezoelectric layer has a substantially uniform thickness; and
    an outer conductor substantially surrounding the piezoelectric layer wherein the sensor includes an inner conductor and an outer conductor and an intervening piezoelectric layer having a substantially uniform thickness.

2. The sensor of claim 1 wherein the piezoelectric strip is formed from PVDF.

3. The sensor of claim 2 wherein the piezoelectric strip is uniaxially oriented.

4. The sensor of claim 2 wherein the piezoelectric strip is biaxially oriented.

5. The sensor of claim 2 wherein the piezoelectric strip is unmetalized.

6. The sensor of claim 2 wherein the piezoelectric strip is metalized on one side only.

7. The sensor of claim 2 wherein the inner conductor is stranded.

8. The sensor of claim 2 wherein the inner conductor is round.

9. The sensor of claim 2 wherein the inner conductor is flat.

10. The sensor of claim 7 wherein inner conductor is formed from copper.

11. The sensor of claim 10 wherein the inner conductor is plated.

12. The sensor of claim 2 wherein the outer conductor is formed from a stranded wire braid.

13. The sensor of claim 2 wherein the outer conductor is formed from a malleable tube.

14. The sensor of claim 13 wherein the outer conductor further comprises a conductive tape.

15. The sensor of claim 13 wherein the outer conductor further comprises a conductive polymer.

16. The sensor of claim 2 further comprising an outer jacket.

17. The sensor of claim 16 wherein the outer jacket is formed from a polymer.

18. The sensor of claim 2 wherein the piezoelectric layer is formed from a single layer of piezoelectric material.

19. A piezoelectric pressure/load sensor comprising:
    an inner conductor;
    a piezoelectric layer formed from first and second overlapping portions of a piezoelectric strip, the first portion wrapped around the inner conductor and the second portion wrapped around the first portion and wherein the piezoelectric layer has a substantially uniform thickness; and
    an outer conductor substantially surrounding the piezoelectric layer wherein the sensor includes an inner conductor and an outer conductor and an intervening piezoelectric layer having a substantially uniform thickness.

20. The sensor of claim 19 wherein the first portion and the second portion are wrapped in the same direction.

21. The sensor of claim 19 wherein the first portion and the second portion are wrapped in the opposite directions.

22. The sensor of claims 20 or 21 wherein the first portion is formed from a first piezoelectric strip and the second portion is formed from a separate second piezoelectric strip.

23. The sensor of claim 22 wherein the piezoelectric strip is formed from PVDF.

24. The sensor of claim 23 wherein the piezoelectric strip is uniaxially oriented.

25. The sensor of claim 23 wherein the piezoelectric strip is biaxially oriented.

26. The sensor of claim 23 wherein the piezoelectric strip is unmetalized.

27. The sensor of claim 23 wherein the piezoelectric strip is metalized on one side only.

28. The sensor of claim 23 wherein the inner conductor is stranded.

29. The sensor of claim 23 wherein the inner conductor is round.

30. The sensor of claim 23 wherein the inner conductor is flat.

31. The sensor of claim 28 wherein inner conductor is formed from copper.

32. The sensor of claim 31 wherein the inner conductor is plated.

33. The sensor of claim 23 wherein the outer conductor is formed from a stranded wire braid.

34. The sensor of claim 23 wherein the outer conductor is formed from a malleable tube.

35. The sensor of claim 23 wherein the outer conductor further comprises a conductive tape.

36. The sensor of claim 23 wherein the outer conductor further comprises a conductive polymer.

37. The sensor of claim 23 further comprising an outer jacket.

38. The sensor of claim 37 wherein the outer jacket is formed from a polymer.

39. The sensor of claim 38 wherein the piezoelectric layer is formed from only the first portion and the second portion.

40. A piezoelectric pressure/load sensor comprising:
an inner conductor;
a piezoelectric layer formed from first and second overlapping portions of a piezoelectric strip, the first portion wrapped around the inner conductor and having adjacent turns wherein substantially each turn overlaps substantially fifty percent of an adjacent turn and the second portion wrapped around the first portion and having adjacent turns wherein substantially each turn overlaps substantially fifty percent of an adjacent turn and wherein the piezoelectric layer has a substantially uniform thickness; and
an outer conductor substantially surrounding the piezoelectric layer wherein the sensor includes an inner conductor and an outer conductor and an intervening piezoelectric layer having a substantially uniform thickness.

41. The sensor of claim 40 wherein the first portion and the second portion are wrapped in the same direction.

42. The sensor of claim 40 wherein the first portion and the second portion are wrapped in the opposite directions.

43. The sensor of claim 41 or 42 wherein the piezoelectric strip is formed from PVDF.

44. The sensor of claim 43 wherein the piezoelectric strip is uniaxially oriented.

45. The sensor of claim 43 wherein the piezoelectric strip is biaxially oriented.

46. The sensor of claim 43 wherein the piezoelectric strip is unmetalized.

47. The sensor of claim 43 wherein the piezoelectric strip is metalized on one side only.

48. The sensor of claim 43 wherein the inner conductor is stranded.

49. The sensor of claim 43 wherein the inner conductor is round.

50. The sensor of claim 43 wherein the inner conductor is flat.

51. The sensor of claim 48 wherein inner conductor is formed from copper.

52. The sensor of claim 51 wherein the inner conductor is plated.

53. The sensor of claim 43 wherein the outer conductor is formed from a stranded wire braid.

54. The sensor of claim 43 wherein the outer conductor is formed from a malleable tube.

55. The sensor of claim 43 wherein the outer conductor further comprises a conductive tape.

56. The sensor of claim 43 wherein the outer conductor further comprises a conductive polymer.

* * * * *